United States Patent
Sundkvist et al.

(10) Patent No.: US 6,651,712 B1
(45) Date of Patent: Nov. 25, 2003

(54) VARIABLE PITCHED TREAD FOR ATV TIRE

(75) Inventors: Karl Eric Sundkvist, Akron, OH (US); Timothy Michael Rooney, Munroe Falls, OH (US); Terry John Waibel, Wadsworth, OH (US); Hiroyuki Aoki, Tokyo (JP); Jin Osada, Tokyo (JP)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/009,029
(22) PCT Filed: Jun. 10, 1999
(86) PCT No.: PCT/US99/13101
§ 371 (c)(1), (2), (4) Date: Nov. 2, 2001
(87) PCT Pub. No.: WO00/76790
PCT Pub. Date: Dec. 21, 2000

(51) Int. Cl.[7] ............... B60C 11/11; B60C 113/00; B60C 121/00
(52) U.S. Cl. ............... 152/209.2; 152/209.12
(58) Field of Search .............. 152/209.2, 209.3, 152/209.12

(56) References Cited

U.S. PATENT DOCUMENTS

| | | | | |
|---|---|---|---|---|
| 1,956,011 A | * | 4/1934 | Evans | |
| 3,951,191 A | | 4/1976 | Suzuki et al. | 152/209 R |
| 5,085,259 A | | 2/1992 | Goergen et al. | 152/209 R |
| 5,580,404 A | | 12/1996 | Hitzky | 152/209 R |
| 5,708,238 A | * | 1/1998 | Asao et al. | |
| 5,733,394 A | | 3/1998 | Baus et al. | 152/209 B |
| 5,843,248 A | | 12/1998 | Baus et al. | 152/209 R |
| 5,879,482 A | * | 3/1999 | Rooney et al. | |
| 6,189,586 B1 | * | 2/2001 | Guidry | |

FOREIGN PATENT DOCUMENTS

| | | | | |
|---|---|---|---|---|
| EP | 268436 | * | 5/1988 | |
| EP | 0508813 | | 10/1992 | B60C/11/00 |
| EP | 0655353 | | 5/1995 | B60C/11/00 |
| JP | 60-60011 | * | 4/1985 | |
| JP | 63-176705 | * | 7/1988 | |
| WO | 9910190 | | 3/1999 | B60C/3/04 |

* cited by examiner

Primary Examiner—Steven D. Maki
(74) Attorney, Agent, or Firm—David L. King

(57) ABSTRACT

An all-terrain vehicle tire (10) operated at 4 psi (0.3 bar) or less inflation pressure has a plurality of lugs (44) arranged in a pitched pattern for noise reduction. The ratio of small (S), medium (M) and large (L) pitches are preferably arranged with a maximum pitch variation between circumferentially adjacent pitches of 1.1 to 1.

4 Claims, 9 Drawing Sheets

VARIABLE PITCHED TREAD FOR ATV TIRE

TECHNICAL FIELD

This invention relates to variable pitched tread for off-road tires, more specifically, pitched treads for very low inflation pressure ATV tires.

BACKGROUND OF THE INVENTION

Repeating tread patterns on vehicle tires designed for on-road usage has long been a source of noise and vibration problems. Changing the arrangement of the tread elements in terms of varying multiple sizes of the tread elements in a predetermined arrangement has long been a practice to reduce tread noise. This tread element size change is commonly referred to as "pitching".

In recent years, the practice of pitching off-road tires has been contemplated for farm tires. U.S. Pat. Nos. 5,733,394 and 5,843,248 assigned to The Goodyear Tire & Rubber Company teach the value of pitching an agricultural tire for reduced vibration caused by lug impact. Lug impact vibration is commonly most noticeable as a first harmonic peak amplitude type of vibration.

The advantages of pitching farm tires having relatively long bars or lugs is now clearly recognized.

A new class of vehicle tires where pitching heretofore has been avoided is the all-terrain vehicle tire. These tires are operated at very low pressure, typically below 7 psi (0.5 bar), generally less than 4 psi (0.3 bar), with 3 psi (0.20 bar) being most common.

These tires are generally quite small having nominal rim diameters of 12.00 inches (30.5 cm) down to about 6.00 inches (15 cm). The tires are operated at such a low pressure because they must have a very low spring rate. The tires are a key component of the all-terrain vehicle's suspension system. These otherwise very soft riding tires must exhibit excellent off-road traction and, accordingly, they employ numerous traction elements yielding a tread having a very low net-to-gross ratio. Like drive axle tractor tires, the traction elements contact surface area is quite small. Unlike drive axle tractor tires, the ATV treads generally use very short traction elements placed on a tread circumference that is typically three times or more smaller than a drive axle tractor tire. Not unexpectedly, the ATV tire designers were quite skeptical about the value of tread pitching. It was doubtful that any real benefit could be achieved in a tire application wherein the vehicle's noise was so loud that the tire noise could barely be discerned.

As ATV vehicles have evolved, a new generation of more environmentally friendly vehicle has developed. Noise damping of the mufflers and engines have resulted in much quieter vehicles. Noise pollution from these vehicles can be dramatically reduced. For hunters and other ATV enthusiasts, noisy ATV vehicles are detrimental.

Challenged with the need to reduce tire noise and vibration at all speed ranges up to 50 mph (80 kph), the ATV tire designer must look to tread patterns which can run much quieter without sacrificing traction.

It is an object of the present invention to have a low pressure ATV tire with a significant tread noise reduction.

It is another object of the present invention to accomplish this noise reduction in a way which is unobtrusive.

DISCLOSURE OF THE INVENTION

Summary of the Invention

An all-terrain vehicle tire (10) has an annular tread (40) and a casing (12) disposed radially inwardly of the tread (40). The casing (12) has a pair of radially inner bead portions (20), a pair of sidewalls (22), one sidewall (22) extending between each bead portion (20) and the tread (40), and a radially inner air chamber extending around the inner periphery of the tire (10).

The tire (10), when mounted on a rim, has an inflated operating pressure in the air chamber of 7 psi (0.5 bar) or less.

The tire (10) has a plurality of spaced tread blocks or traction elements (44) extending radially outwardly from a tread base (42). The blocks or traction elements (44) are arranged in an array of 20 or less total pitches, the pitches having at least three distinct pitch lengths of small (S), medium (M), and large (L); wherein the ratio of large (A) to small (S) is at least 1.1 to 1.

The all-terrain vehicle tire (10) has a nominal rim diameter (D) of less than or equal to 12.00 inches (30 cm) with a normal operating pressure of about 4 psi (0.3 bar).

Preferably, the pitches small (S), medium (M) and large (L) are arranged in the array of 20 pitches or less such that no circumferentially adjacent pitch is more than 10% larger or 10% smaller than the medium pitch (M).

In the preferred invention, the small (S), the medium (M) and the large (L) pitch lengths are arranged in a sequence as follows: SMMMSMSMLMMLMSMLLLM. Alternatively, the sequence of MSMLMSMLMSMLMSMLMSM. Most preferably, the ratio of small (S), medium (M), and large A) pitch lengths satisfies the size ratio of 9:10:11.

Definitions

"Aspect Ratio" means the ratio of its section height (SH) to its section width (SW).

"Axial" and "axially" means the lines or directions that are parallel to the axis of rotation of the tire.

"Bead" means that part of the tire shaped, with or without other reinforcement elements such as an annular tensile member, flippers, chippers, apexes, toe guards and chafers, to fit the design rim.

"Belt reinforcing structure" means at least two annular layers or plies of parallel cords, woven or unwoven, underlying the tread, unanchored to the bead, and having both left and right cord angles in the range from 17° to 27° with respect to the equatorial plane of the tire.

"Bias ply" means a tire having bias angled carcass, the angle of the cords being about 25 to 50° relative to the equatorial plane of the tire. Each adjacent ply has cords equal but oppositely oriented.

"Carcass" means the tire structure apart from the belt structure, tread, undertread, and sidewall rubber over the plies, but including the beads.

"Casing" means the tire structure apart from the tread and undertread, but including the sidewalls.

"Circumferential" means lines or directions extending along the perimeter of the surface of the annular tread perpendicular to the axial direction.

"Design rim" means a rim having a specified configuration and width.

"Design rim width" is the specific commercially available rim width assigned to each tire size and typically is between 75 and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the center of the tire and "outer" means toward its exterior.

"Leading" refers to a portion or part of the tread that contacts the ground first, with respect to a series of such parts or portions, during rotation of the tire in the preferred direction.

"Net-to-gross ratio" means the ratio of the tire tread rubber that makes contact with a hard flat surface, divided by the area of the tread located between the lateral edges of the tread including non-contacting portions such as grooves as measured 360° circumferentially about the tire when the tire is inflated and under normal load conditions.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Ply" means a continuous layer of rubber-coated parallel cords.

"Radial" and "radially" mean directions radially toward or away from the axis of rotation of the tire.

"Radial ply tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF THE DRAWINGS

FIG. 4 shows the tread contour of the tire (10) illustrated in FIG. 1 having three distinct design cycles or pitches small (S), medium (M) and large (L).

FIG. 5A is a view of a portion of the tire tread contour of the preferred embodiment having pitch boundaries passing through a tread traction element (44).

FIG. 5B is an alternative tread with the pitch boundary circumferentially spaced between traction elements (44).

FIGS. 6A, 6B and 6C in combination illustrates the entire three design length pitch sequences of a preferred embodiment tire according to the invention.

DETAILED DESCRIPTION OF THE INVENTION

Figure 1:
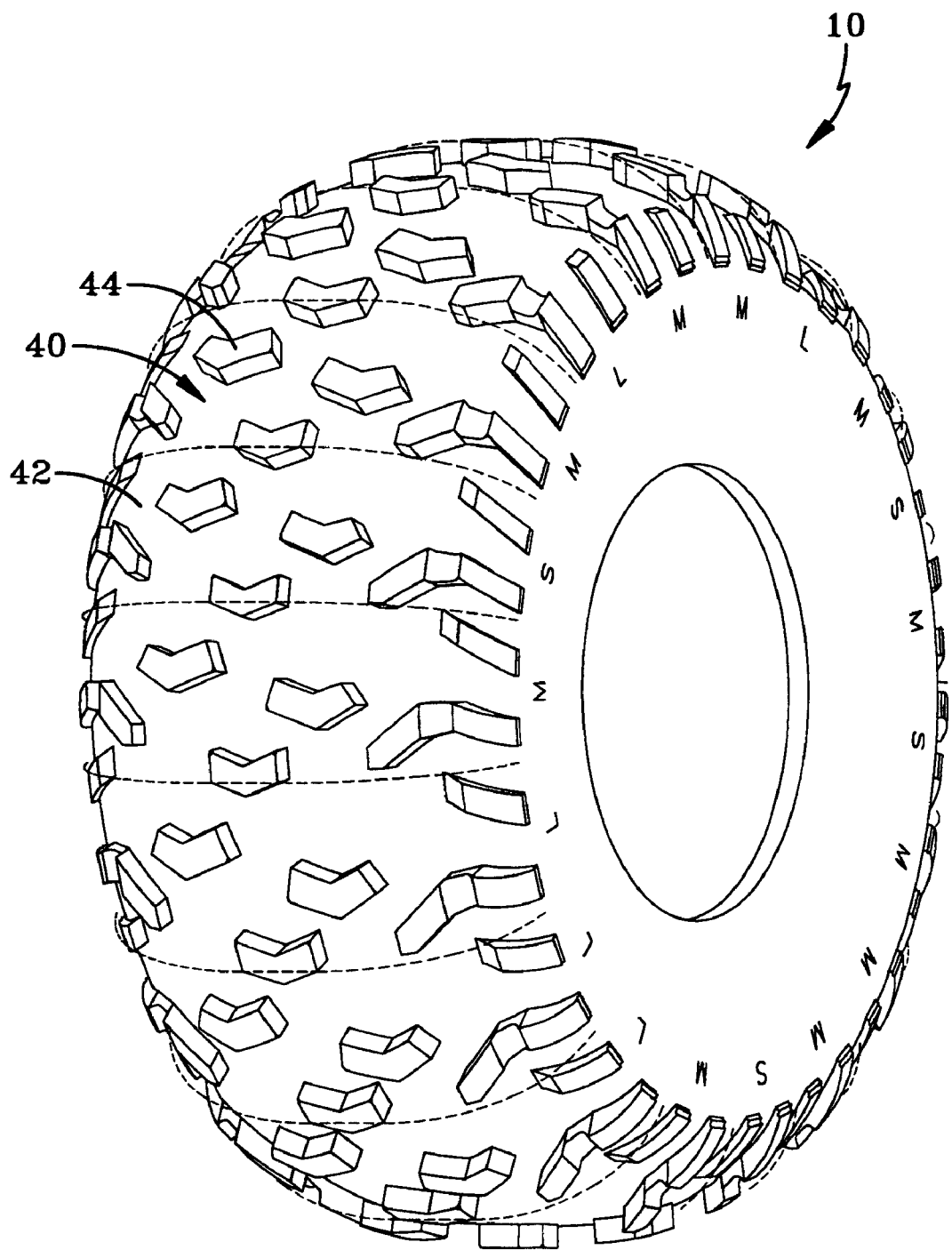
FIG. 1 illustrates a perspective view of a preferred embodiment all-terrain vehicle tire (10) made in accordance with the present invention.
Figure 2:
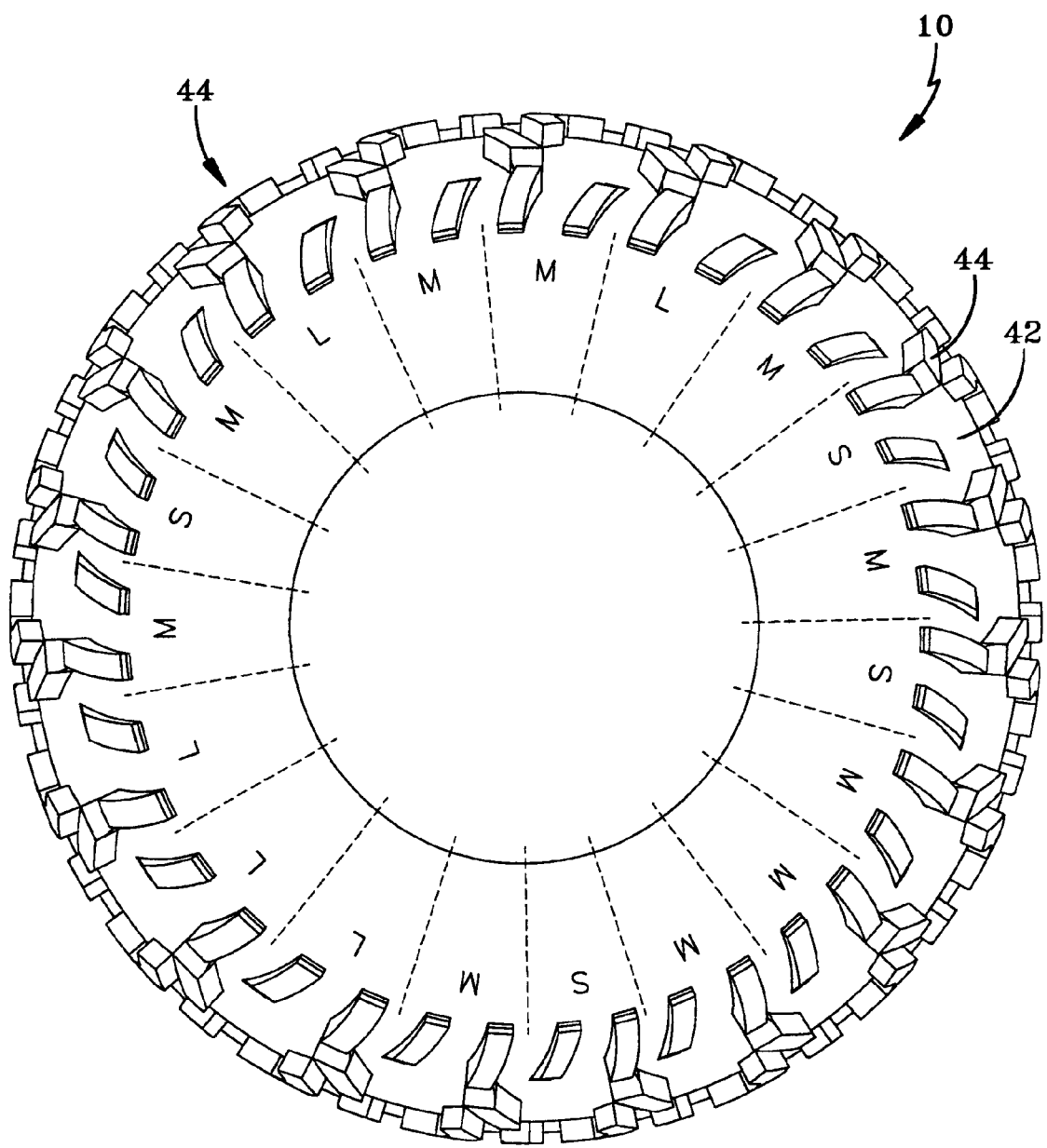
FIG. 2 is side view portion of the tire (10) illustrated in FIG. 1.

With particular reference now to FIGS. 1–3 and 5A, a preferred embodiment of the pneumatic all-terrain vehicle tire (10) made according to the present invention is illustrated.

The illustrated tire (10) has a nominal rim diameter of 12 inches (30 cm or less). Alternatively, the diameter can be of any size suitable for ATV use such as 10, 8 or 6 inches (25, 20, 15 cm). The tire (10) has an axis of rotation, an equatorial plane (EP) and a maximum section width. The tire (10) has a casing (12) and a tread (40). The casing (12) may include a cord reinforced rubber-oated carcass (14) and a pair of bead portions 20). The carcass (14) has a tread (40), a pair of sidewalls (22), one sidewall extending between each bead portion (20) and the illustration in FIG. 3, the carcass (14) has two bias plies (15) extending from bead (20) to bead 20 and optionally may have a breaker reinforcement structure including two breaker plies (13) radially outward of the carcass plies (15). The tire (10) has the tread (40) disposed radially outwardly of the casing (12). The preferred tire has a load index of 2 stars (or at least 5 psi, 395 lbs.). Any number of breaker plies or carcass plies may be employed dependant on the service conditions required Small diameter off-road ATV tires, due to their size, use a smaller number of traction lugs or elements (44). This means that fewer traction elements (44) can be added around the circumference of the tire (10) while maintaining the element spacing sufficiently open to provide traction on soft surfaces as well as ensuring that the tread (40) does not pack with mud. Fewer elements (44) means that the noise, vibration, and ride handling problems are exaggerated, making a solution to these problems of utmost importance if the tire 10 is to be acceptable to the operators of the all-terrain vehicles. The openness and depth of the elements (44) means that the tire should exhibit excellent traction. The inventors' novel pitching solution make the use of such a tread feasible.

Figure 4:
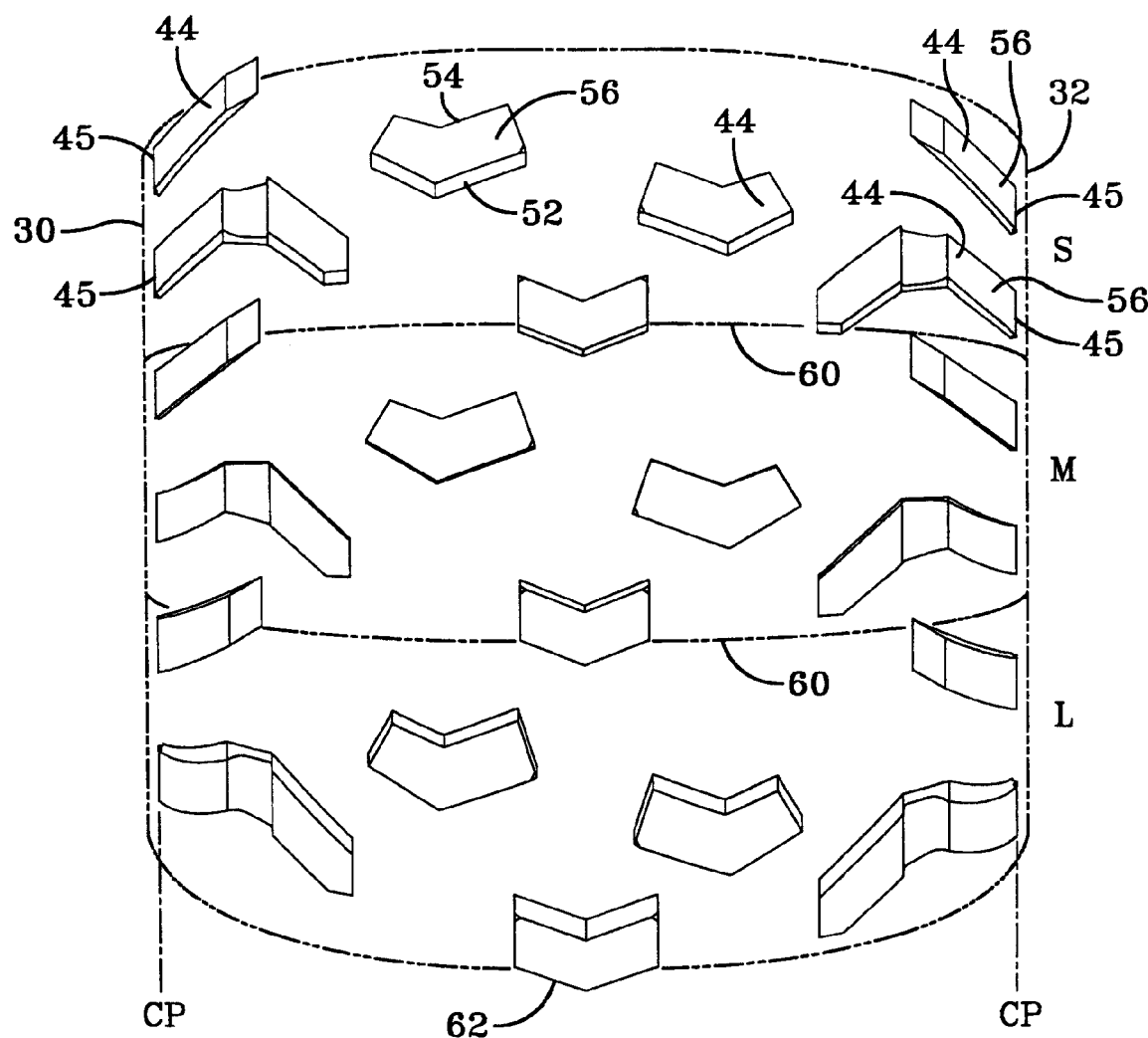
FIGS. 4, 5A, 5B, 6A, 6B and 6C illustrate views taken from the contours of a portion of the tread of tires.
Figure 5A:
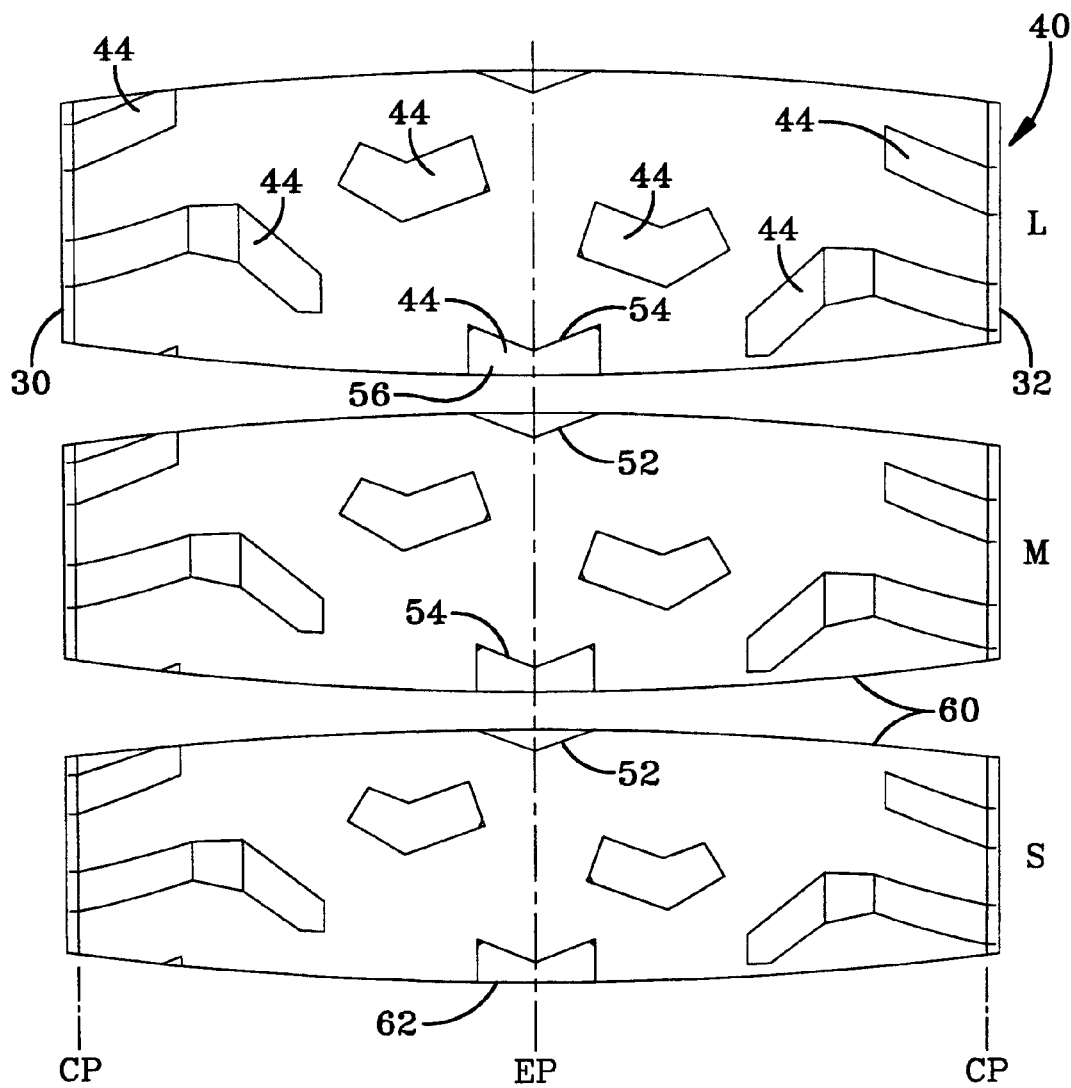
Figure 5B:
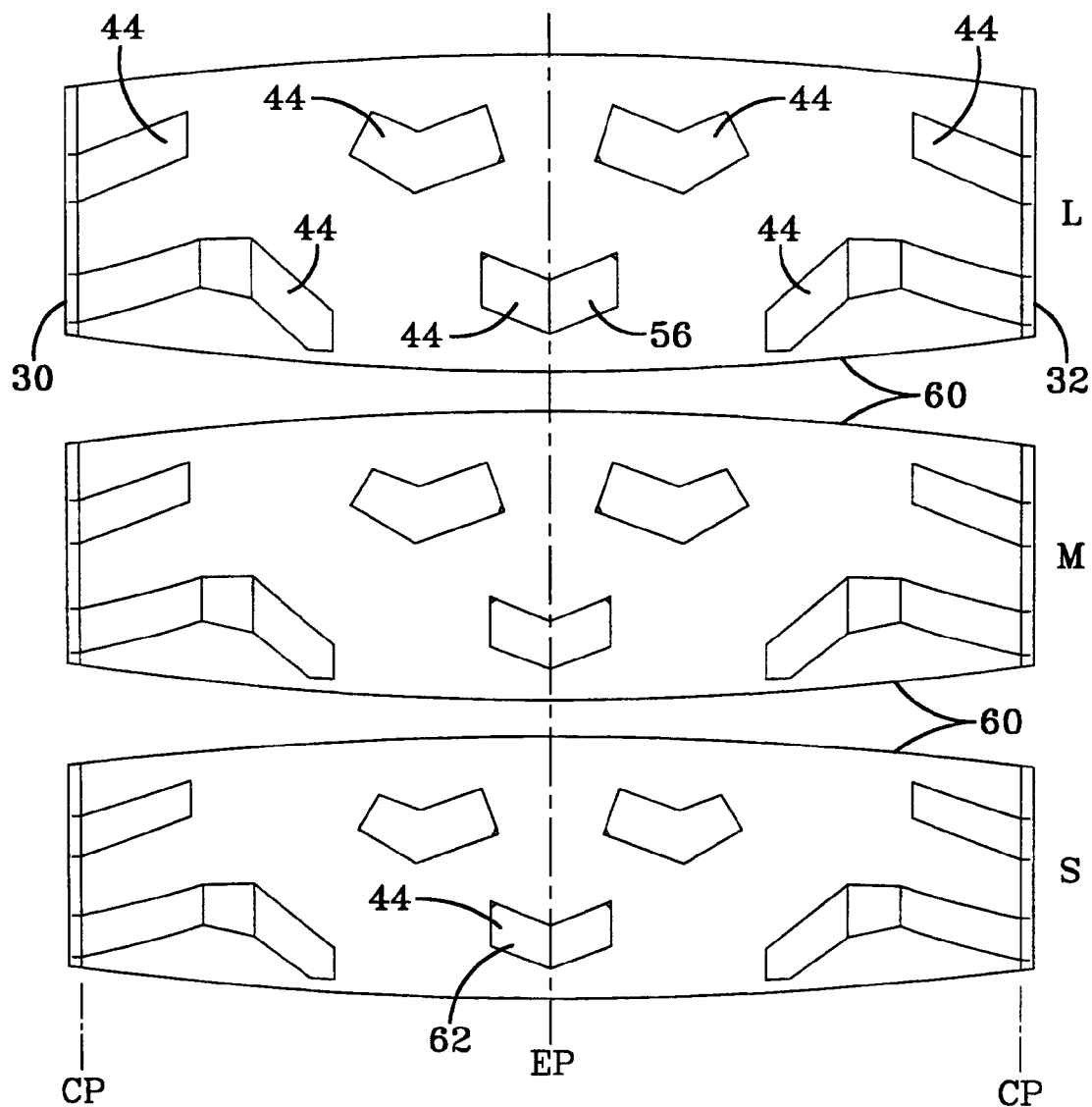
Figure 6A:
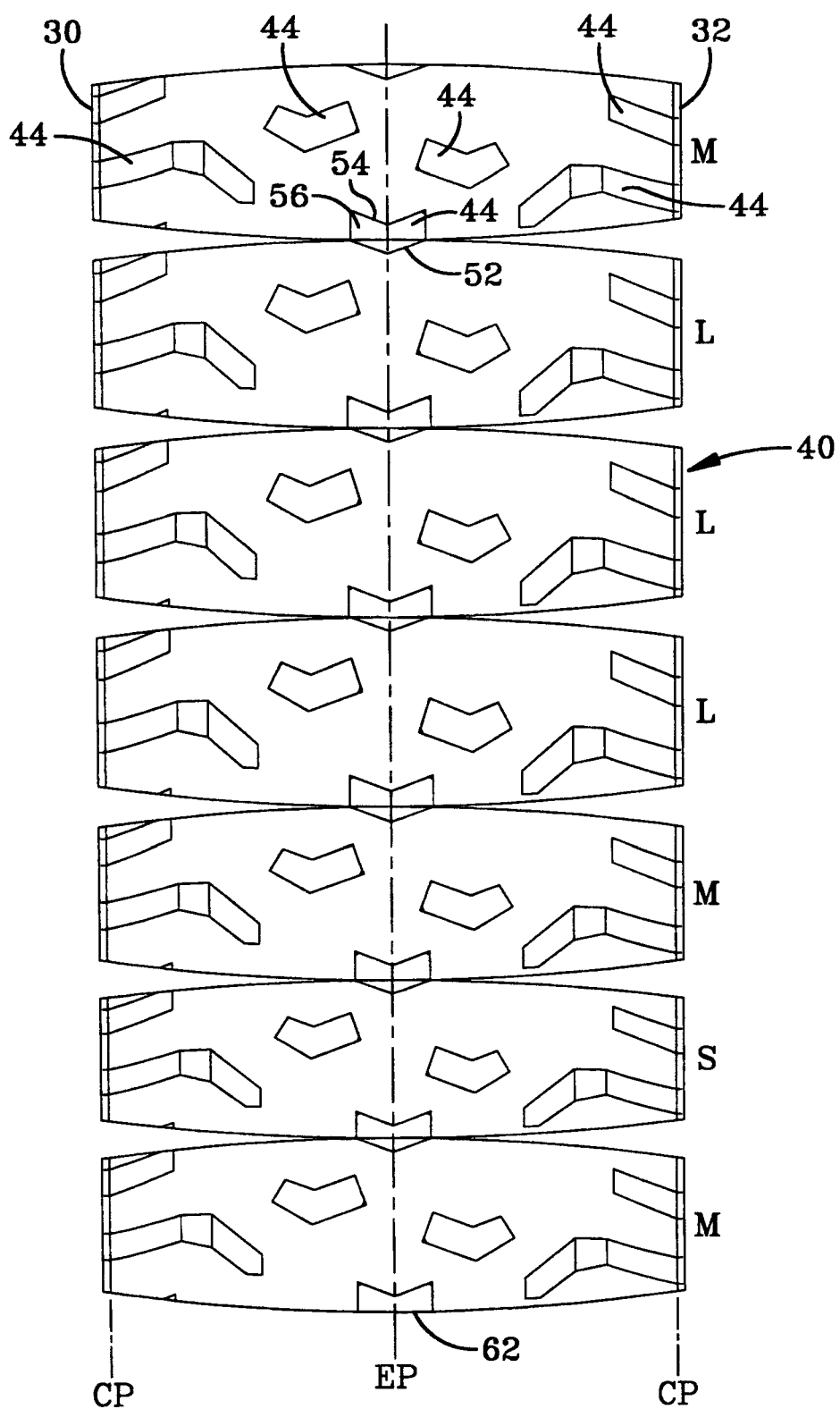
Figure 6B:
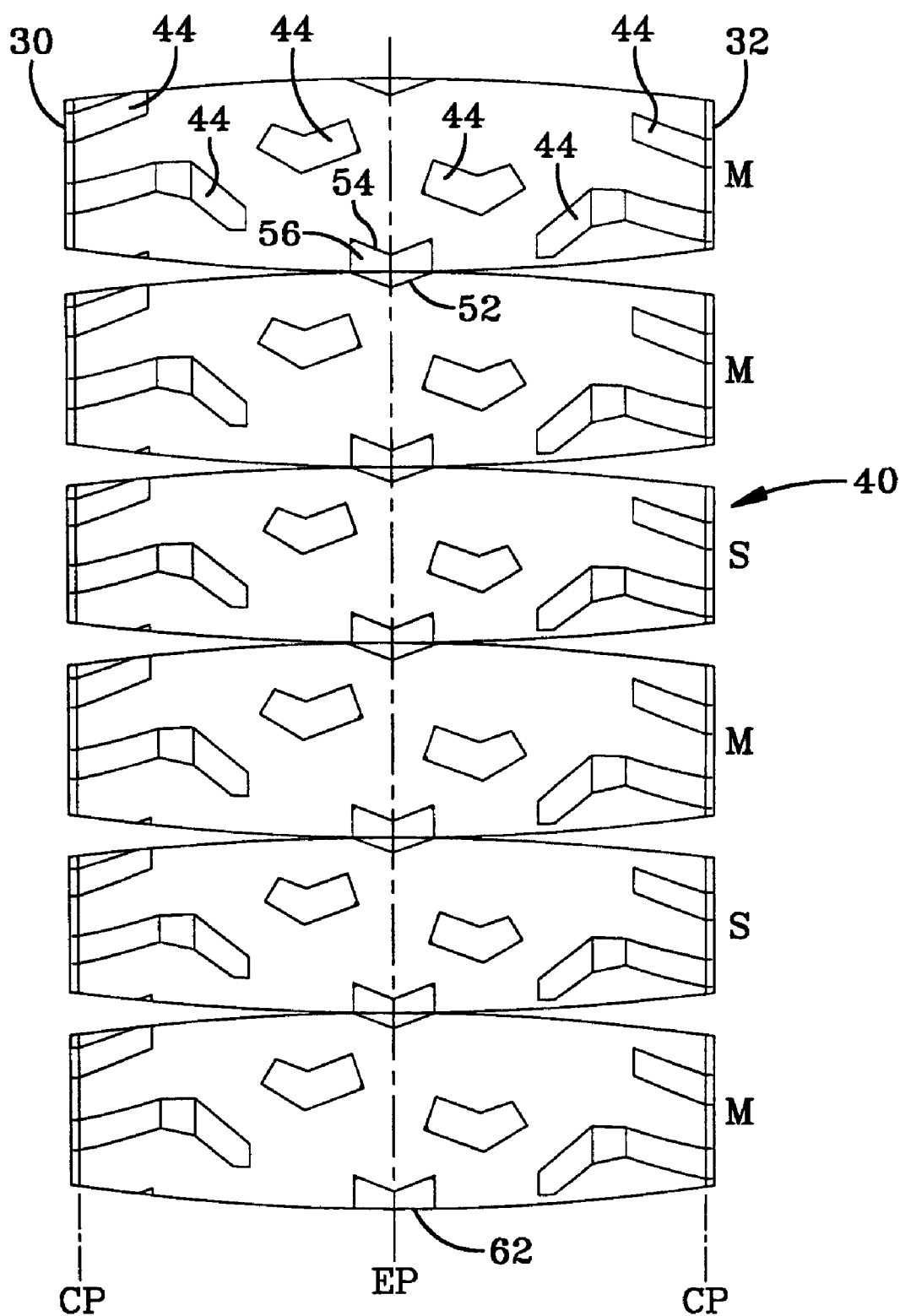
Figure 6C:
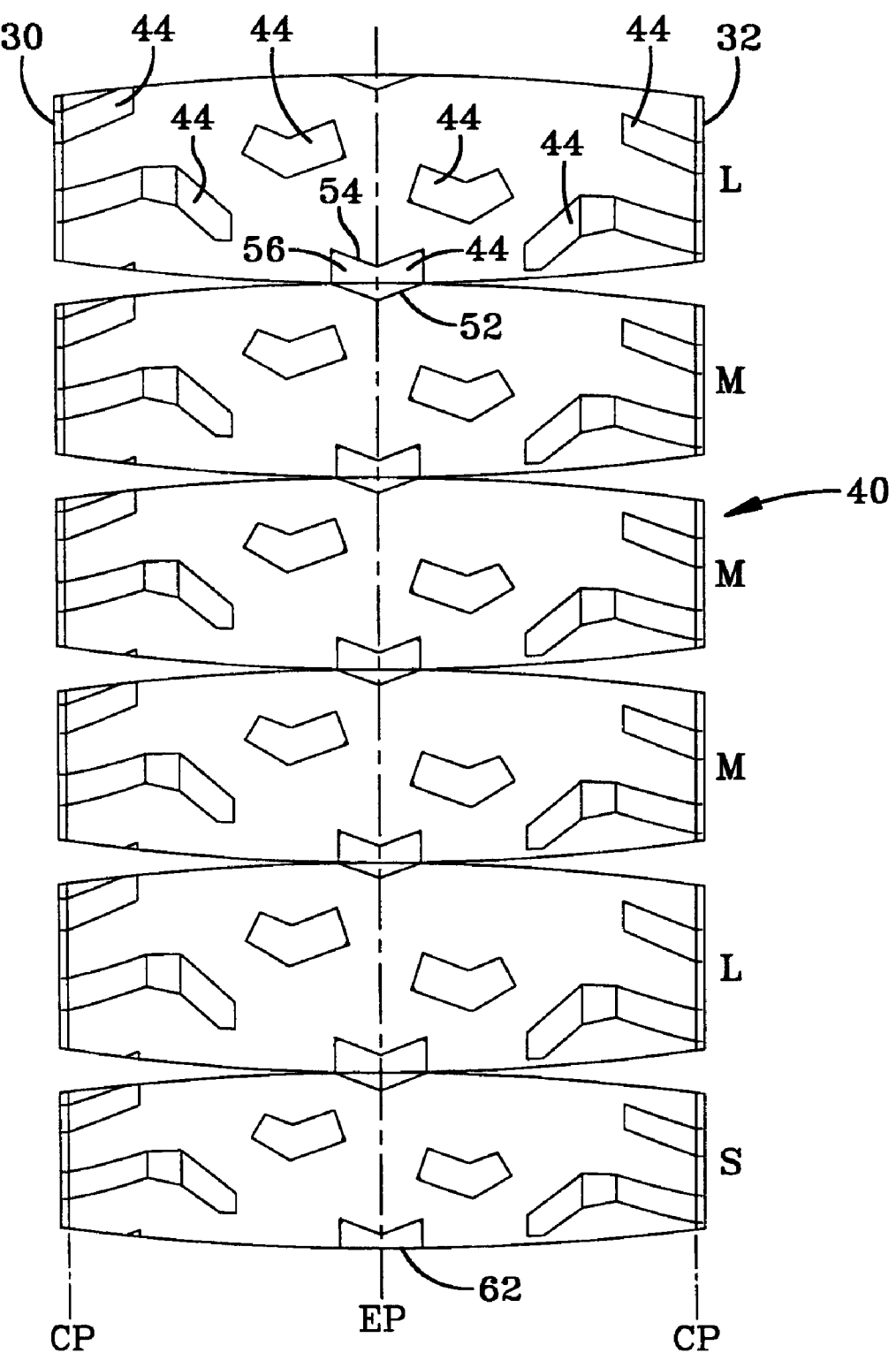

As illustrated in FIGS. 4–5B, a tire according to the present invention can be designed with a variety of lug spacings. The preferred embodiment employs three design cycles, (S), (M), (L), alternatively, four design cycles (S), $(M_1)$, $(M_2$ and (L) can be used. One advantage of employing variable or distinct spacings is that the tread design pattern can employ a variety of lug shapes while maintaining a sufficient spacing of the lugs (44) at the center of the tread (40) to insure that the tire (10) does not pack with mud and the lugs or traction elements (44) do not have a serious deformation problem under high torque or high loads.

In the illustrated views of FIGS. 4, 5A, 5B, 6A, 6B and 6C, the circumferential distance between the pitch boundaries (60) define the pitch or design cycle length (S), (M) or (L). For ease of measurement, these lengths are shown at a plane CP, the plane CP located at each respective tread edge (30, 32). The tread edges (30, 32) are defined as the location where the radially outer surface (56) of the lug (44) intersects the axially outer end (45) of the lug (44). Generally, these locations are aligned about the tread. In applications where the outer ends of adjacent lugs are not aligned, the plane CP can be determined by simply picking a fixed distance axially outward relative to the equatorial plane such as 75% of the section width of the tire. The selection of the plane CP can be somewhat arbitrary in that it is only the relative spacing of the lugs around the tread that is of importance.

When employing three distinct design cycles (S), (M), and (L), it is believed that the number of lugs (44) within each set or row of lugs (44) should be equal and range from 12 to 24 lugs per set as measured at the centerplane of the tire around the total circumference.

As illustrated in FIGS. 4–6C, the lugs (44) may be of various shapes such as, but not limited to, straight, curved or multi-angled polygons. Furthermore, they can extend inwardly not crossing the equatorial plane, or can cross the equatorial plane as in FIGS. 4, 5A and 6. The conventional practice in the ATV tire art was to employ evenly or uniformly spaced tread lugs. That is to say the tread lugs had a single spacing or pitch circumferentially.

In order to correct the mass unbalance concerns, a 19 pitch sequence employing three design cycle lengths, small (S), medium (M) and large (L) was attempted on an exemplary AT25X11-10 type tire as shown in FIG. 1. The optimized pitch sequence was as follows:

MLLLMSMMMSMSMLMMLMS. Alternatively, the sequence of MSMLMSMLMSMLMSMLMSM. Most preferably, the ratio of small (S), medium (M), and large (L) pitch lengths satisfies the size ratio of 9:10:11. This preferred sequence is depicted in the tread portion of FIGS. 6A, 6B and 6C. The tread (40) as shown in FIG. 4 is divided into a plurality of circumferentially repeating design cycles (S, M, L), the design cycles having a total of at least three different design cycle lengths, including a short length (S), medium length (M), and a large length (L). In the embodiment of FIGS. 4, 5A, 6A, 6B and the design cycles extend parallel to the axis of rotation from the first tread edge (30) to the second tread edge (32) crossing the equatorial centerplane. The lugs of the centerline set or row (62) respectively circumferentially extend across two or more circumferentially adjacent design cycles (S, M, L), each lug (44) of this centerline row or set (62) lying within two cycles and being circumferentially offset by at least a portion of a design cycle relative to the circumferentially adjacent lugs (44) of the other rows of lug (44).

To further reduce the mass imbalance problems, it was determined that the width (W) of each lug (44) should be made proportional to the design cycle length (S), (M) or (L) in which a majority of the radially outer surface (56) of the lug (44) lies. As shown in FIG. 5B, all of the radially outer surface (56) of each lug (44) is located preferably within one design cycle. Each design cycle (S), (M )or (L) has a leading boundary line (60) and a trailing boundary line (60). The circumferential space between the leading and trailing boundary lines (60) defines one design cycle. These leading and trailing boundary lines preferably intersect the leading (52) or trailing edge (54) of a lug (44) of the centerline in row (62), as shown in FIG. 5A the leading edges (52) and the boundary lines (60) intersect. The leading boundary line (60) of a design cycle is also coincident with the trailing boundary line (60) of a circumferentially adjacent design cycle. Therefore, as illustrated, a single reference numeral (60) is shown in FIGS. (5A) and (5B). Alternatively as shown in FIG. 5B, the boundary lines can be circumferentially spaced between two circumferentially adjacent lugs (44) within a set or row.

When the lugs are of uniform length, shape, and proportional in lug width (W) relative to design cycle length means that the mass of tread rubber can be more uniformly distributed around the tire (10). The mold having lug width $W_S$, $W_M$, $W_L$ proportional to the length of the design cycle insures that the volume or mass of tread rubber is substantially uniform about the tread. It is believed possible to have the tread pitched using three or more design cycle lengths and have a tread that is uniform within plus or minus 5% by weight in any quarter or 90° section of the tire (10). This uniformity greatly reduces the mass unbalance problems in pitched ATV tires.

When designing a pitched ATV tire (10) as described above the designers fixed the maximum and minimum width of the lugs so as to have sufficient stiffness and load bearing capacity while avoiding crushing or severe deformation of the lugs (44). The preferred invention tire of FIG. 5A had a minimum lug thickness of 15 mm. The maximum lug width (W) was chosen to be about 1.25 times the minimum lug width. The inventors then chose 19 pitches. The sequence was calculated establishing the number of large, small and medium pitches or design cycles. They then summed up and calculated the radial angle for an (S), (M) or (L) design cycle thus establishing the pitch length at the outside diameter of the tire. The sum of pitch length angles naturally equaling 360°.

The designers then starting at one point of the circumference position one lug (44) and then sequentially position the other lugs (44) around the tread, thus, developing complete rows of lugs (44). The inventors observed that a visually, observable size or spacing distortion of the lugs was apparent.

The inventors observing this phenomena noted that this problem occurs when the design cycle length changes from (L) to (S), (L) to (M), (S) to (L), (S) to (M), (M) to (S) or (M) to (L). This is because the lugs (44) of the center row can be overlapping two different 10 circumferential design cycle distances. In the case of a lug (44) which straddles two design lengths of ½ (S) and ½ (L), the lug (44) of row (62) being in a design cycle of either (S) or (L) means that the lug will not be proportional. The design cycle size transition points can be corrected if the lug is shifted ½(L/2+S/2). This centers the lug (44). Accordingly, as a final design step the designer may choose to correct the last developed set of lugs (44) at these transition areas where the design cycle length changes.

Testing of the three design cycle pitched tires (10) as disclosed above resulted in a marked reduction in the $2^{nd}$ and $3^{rd}$ pitching harmonic when compared to the same tire construction having the conventional single or uniform pitch. The small (S), medium (M) and large (L) design cycles had a pitch ratio of 9:10:11 respectively. When the medium design length was normalized at 100, the large design cycle length was 110, the small design cycle length was 90. The maximum variation from small to large design cycle was 1.25. This optimized three design cycle sequence reduced the noise level from the $2^{nd}$ pitching harmonic by 30%. It is believed that up to a 1.25 pitch or design cycle variation most favorably reduces the tread excitation to an acceptable level without significant mass unbalance problems. However, due in part to the very small size of the tires, a pitch variation of 1.25 yields an unacceptable visual appearance. Accordingly, the designers elected to modify the pitching sequencing such that no size shift of S to L or L to S would be circumferentially adjacent. This greatly limited the amount of the size sequences of pitches that could be employed. It further meant that the amount of vibration induced noise reduction could be hampered by this additional constraint, which effectively meant that at least one medium (M) pitch must be employed between any large (L) and small (S) pitch around the tread (40). This added constraint insured that the maximum pitch variation between adjacent pitches would be reduced from 1.25 to 1.1. The resultant evaluation of test tires indicated marked improvements in noise reduction was in fact achievable even under this greater appearance-driven constraint.

Those skilled in the art have historically believed that multiple pitching of ATV tires having a net-to-gross ratio of less than 30% provided little or no benefit at a substantially higher cost. The new ATV tire constructions have a wider, flatter tread footprint making pitching more practical, particularly on the rear drive axle position.

The present invention permits ATV tires as shown in FIG. 1 to be used at speeds up to 80 KM/hr without serious tire noise vibration problems.

The employment of a maximum pitch ratio variation of 1.1 was dictated by appearance and traction constraints. Alternatively, somewhat higher variations could be employed with suspected favorable vibration results at the loss of appearance and traction performance.

Alternatively, multiple design cycles of 4 or more could also be used, however, they are naturally somewhat more complicated and, therefore, more costly.

Figure 3:
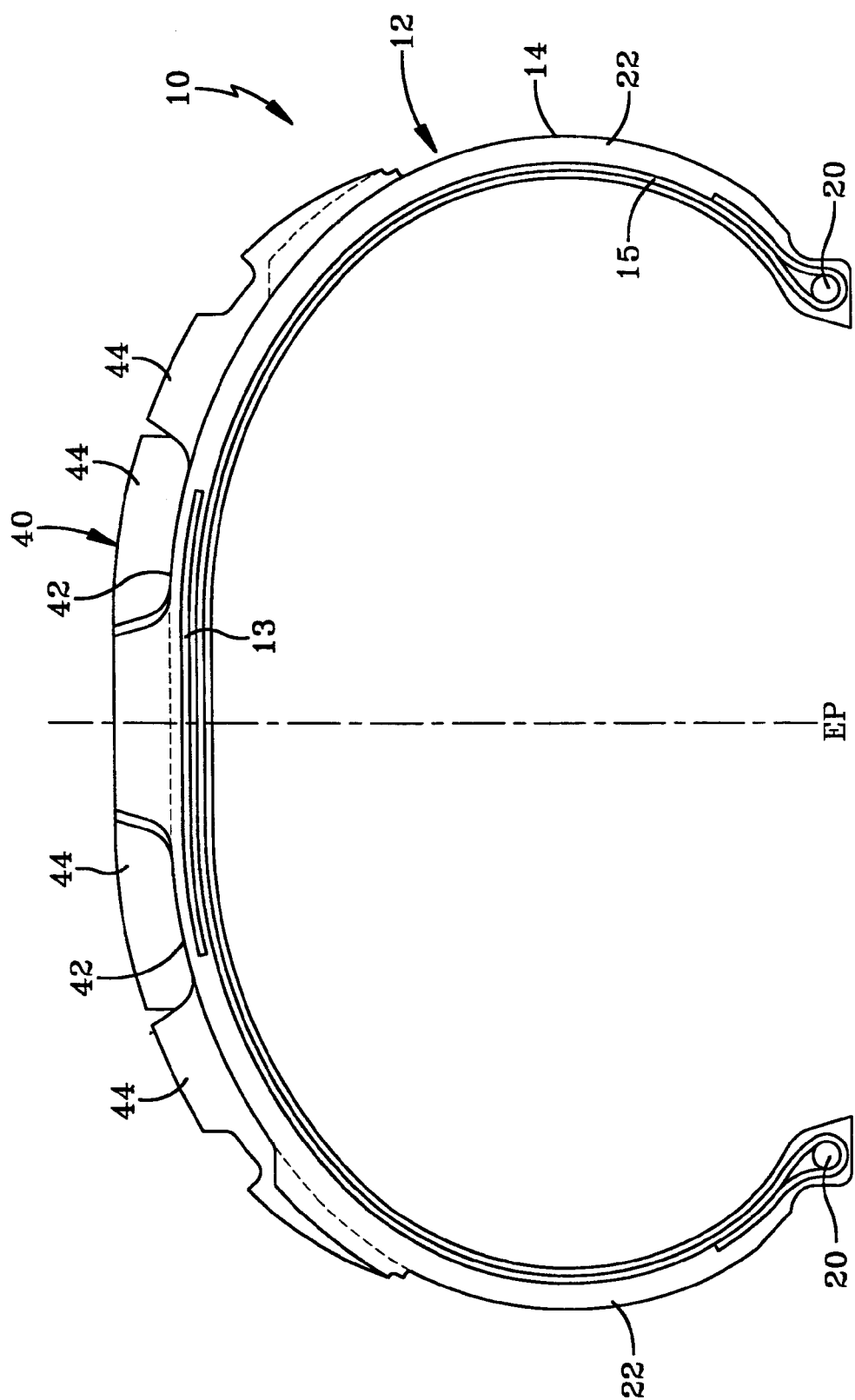
FIG. 3 is a cross-sectional view of the tire (10) of FIG. 1.

In testing the pitched ATV tire according to the present invention a size AT25X11-10 was fabricated. The tire (10) had a cross-section as shown in FIG. 3. The tire was designed specifically for a rear wheel position of an ATV vehicle. The maximum section height was 7.232 inches (18.4 cm), the maximum section width was 11.4 inches (29 cm). The nominal rim diameter is 10 inches (25.4 cm). The ratio of maximum section width to nominal rim diameter of these rear tires for ATV's is generally at least 80%, and often 100% or greater. This tremendous width to rim diameter relationship is quite uncommon. Almost no truck or passenger type vehicle has tires of this small rim diameter relative to the tire's width. It is believed these very wide treads turning on such small diameters create high revolutions per minute resulting in a very noisy tire. The tread lugs, being widely spaced, create harsh impacts with the surface at comparatively high revolutions per minute. For this reason, the noise problems seem slightly exaggerated. Nevertheless, the rear ATV tires with a wider tread and more lateral lugs than the front tires seem to be noisier and, thus, they benefit most from pitching.

Another important aspect of the present invention is that the tread lugs have been purposely angularly oriented to minimize any leading or trailing edges of the lugs being purely lateral or axially extending. This insures the phenomenon of "lug slapping" is minimized as the edges of the lug enters or leaves the contact patch. This, in combination with the preferred pitching sequence, yielded results of 30% or more reduction in noise and vibration across the $2^{nd}$ and $3^{rd}$ harmonic noise spectrum.

What is claimed is:

1. An all-terrain vehicle tire having an annular tread, a casing disposed radially inwardly of the tread, the casing having a pair of radially inner bead portions, a pair of sidewalls, one sidewall extending between each bead portion and the tread, and a radially inner air chamber extending around the inner periphery of the tire, the tire when mounted on a rim has an inflated operating pressure in the air chamber of 7 psi (0.5 bar) or less, the tire having a plurality of spaced tread blocks or traction elements extending radially outwardly from a tread base, the blocks or traction elements being arranged in an array of 20 or less total pitches, the pitches having at least 3 distinct pitch lengths of (S), (M), (L); wherein the ratio of small (S) to large (L) is at least 1 to 1.1; the tire being characterized by the twenty or less total pitches being in a pitching sequence such that no size shift of S to L to S would be circumferentially adjacent and wherein the small (S), the medium (M) and the large (L) pitch lengths are arranged in a sequence as follows: MLLLMSMMMSMSMLMMLMS.

2. The all-terrain vehicle tire of claim 1 wherein the tire has a nominal rim diameter (d) of less than or equal to 12.00 inches (30.5 cm).

3. The all-terrain vehicle tire of claim 1 wherein the pitches (S), (M), (L) total 19 pitches and are arranged circumferentially such that no circumferentially adjacent pitch is more than 10% larger or 10% smaller than the medium pitch (M).

4. The all-terrain tire of claim 1 wherein the operating pressure is about 4 psi (0.3 bar).

* * * * *

UNITED STATES PATENT AND TRADEMARK OFFICE
CERTIFICATE OF CORRECTION

PATENT NO.    : 6,651,712 B1
DATED         : November 25, 2003
INVENTOR(S)   : Karl Eric Sundkvist et al.

It is certified that error appears in the above-identified patent and that said Letters Patent is hereby corrected as shown below:

<u>Title page,</u>
Item [73], Assignee, should read
-- The Goodyear Tire & Rubber Company
   Akron, OH (US)

Honda Giken Kogyo Kabushiki Kaisha
Tokyo, Japan --

Signed and Sealed this

Twenty-fifth Day of May, 2004

JON W. DUDAS
*Acting Director of the United States Patent and Trademark Office*